United States Patent
Nash

(10) Patent No.: US 8,757,566 B2
(45) Date of Patent: Jun. 24, 2014

(54) HAND RAIL MOUNTING SYSTEM

(75) Inventor: Alan C. Nash, Milwaukee, WI (US)

(73) Assignee: R & B Wagner, Inc., Butler, WI (US)

( * ) Notice: Subject to any disclaimer, the term of this patent is extended or adjusted under 35 U.S.C. 154(b) by 46 days.

(21) Appl. No.: 13/157,149

(22) Filed: Jun. 9, 2011

(65) Prior Publication Data
US 2011/0303811 A1 Dec. 15, 2011

Related U.S. Application Data

(60) Provisional application No. 61/353,207, filed on Jun. 9, 2010.

(51) Int. Cl.
*F16M 11/00* (2006.01)
(52) U.S. Cl.
USPC .......................... 248/201; 403/174; 403/180
(58) Field of Classification Search
USPC ......... 256/19, 65, 68; 248/201; 403/174, 180, 403/182
See application file for complete search history.

(56) References Cited

U.S. PATENT DOCUMENTS

| | | | |
|---|---|---|---|
| 53,143 A | 3/1866 | Hawkins | |
| 55,198 A | 5/1866 | Baum | |
| 2,348,071 A | 5/1944 | Johnstone | |
| 3,441,253 A * | 4/1969 | Blum et al. | 256/70 |
| 3,767,236 A | 10/1973 | Horgan, Jr. | |
| 3,776,523 A | 12/1973 | Weiland | |
| 4,007,919 A | 2/1977 | Totten | |
| 4,986,513 A * | 1/1991 | Schultz et al. | 256/65.06 |
| 5,193,786 A | 3/1993 | Guenther | |
| 5,362,030 A | 11/1994 | Iler, Jr. et al. | |
| 5,364,077 A | 11/1994 | Venegas, Jr. et al. | |
| 5,370,368 A * | 12/1994 | Terrels et al. | 256/19 |
| 5,437,433 A | 8/1995 | Rezek | |
| 5,615,968 A | 4/1997 | Verenski et al. | |
| 6,290,213 B1 | 9/2001 | Laird et al. | |
| 6,568,658 B2 | 5/2003 | Strome | |
| 7,044,450 B2 | 5/2006 | Striebel et al. | |
| 7,448,820 B1 * | 11/2008 | Faber | 403/240 |
| 7,540,472 B2 | 6/2009 | Striebel et al. | |
| 7,690,629 B1 | 4/2010 | Briggs et al. | |
| 7,861,475 B2 | 1/2011 | Sprague | |
| 2007/0176159 A1 | 8/2007 | Schram et al. | |
| 2008/0277640 A1 | 11/2008 | Striebel et al. | |

FOREIGN PATENT DOCUMENTS

| | | |
|---|---|---|
| CN | 2587975 | 11/2003 |
| JP | 52065947 | 5/1977 |
| WO | 92/21886 | 12/1992 |
| WO | 2007113515 | 10/2007 |

* cited by examiner

*Primary Examiner* — Amy J Sterling
(74) *Attorney, Agent, or Firm* — Nicholas A. Kees; Godfrey & Kahn, S.C.

(57) ABSTRACT

A hand rail mounting system having a rail with an open end and a barrel with a open end configured to fit about closely about an outer surface of the first rail. The rail may be slidably received within the barrel. A clamp is positioned within the barrel and extends into the open end of the rail, with a portion of the end of the rail between the clamp and the barrel. A screw extends through the barrel and engages the saddle. The screw configured so that rotating the screw will draw the clamp toward the barrel and capture the end of the rail within the barrel between the barrel and the clamp. The end of the rail is generally contained within the barrel.

20 Claims, 22 Drawing Sheets

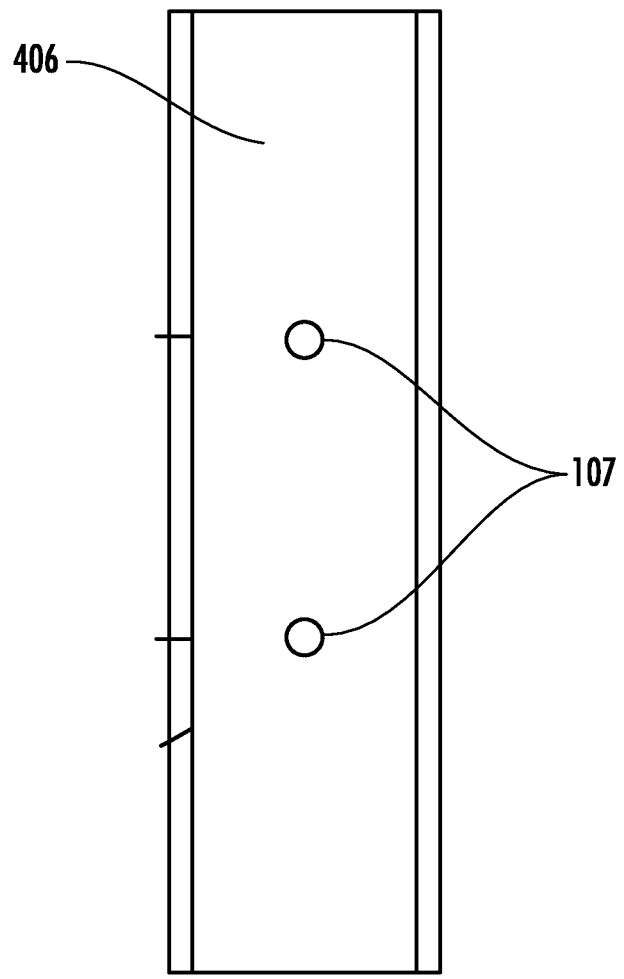

US 8,757,566 B2

HAND RAIL MOUNTING SYSTEM

CROSS-REFERENCE TO RELATED APPLICATION

The present application claims priority to U.S. Provisional Application Ser. No. 61/353,207, filed on Jun. 9, 2010, the disclosure of which is incorporated herein by reference in its entirety.

TECHNICAL FIELD

The present disclosure relates generally to mounting systems for hand rails.

BACKGROUND

It is conventional to mount hand rails along stairs, ramps, walk ways, and similar pedestrian thoroughfares to provide a secure grab point for a person transiting through the space. When hand rails are mounted to walls or other existing structures, the spacing of the supports may be irregular, making it difficult to use standard or common length rails to extend between the supports. Alternatively, the spacing of the supports may be regular and consistent along the thoroughfare but the spacing may not match up to standard length rails sections. Further, while the planning spacing may be regular enough to permit the pre-cutting of rails for installation, the reality of the installation may not match the plans and the pre-cut sections may not fit the installation.

These scenarios typically call for the cutting of rail sections in the field to match the particular needs and requirements of an installation. Conventional supports have exposed the cut ends of the rails sections, requiring that the cut ends also be dressed and cleaned in the field. For some materials and some installations, there may also be a need to renew rust- or weather-proofing of the cut ends as well. To ensure that the cuts are cleanly and consistently executed, a more elaborate saw or cutting system may be needed in the field. Welding may also be required to fasten lengths of railing together, and these welds would also need to be similarly dressed and possibly weather-protected.

To ensure that the rails meet closely enough for welding or to avoid any unsightly gaps between rails, precision in the cutting of the rails may also require additional labor or more highly skilled labor for installation.

It is a further issue that replacement of installed rails may require similar high levels of precision and skill, as well as new dressing of any joints or welds between rails.

Improvements to the conventional systems and other known approaches to installing and repairing hand rails are desirable.

BRIEF DESCRIPTION OF THE DRAWINGS

The accompanying drawing figures, which are incorporated in and constitute a part of the description, illustrate several aspects of the invention and together with the description, serve to explain the principles of the invention. A brief description of the figures is as follows:

FIG. 12 is a top view of a clamp for use with the barrel of FIG. 10.

FIG. 13 is an end view of the clamp of FIG. 12.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

Figure 1:
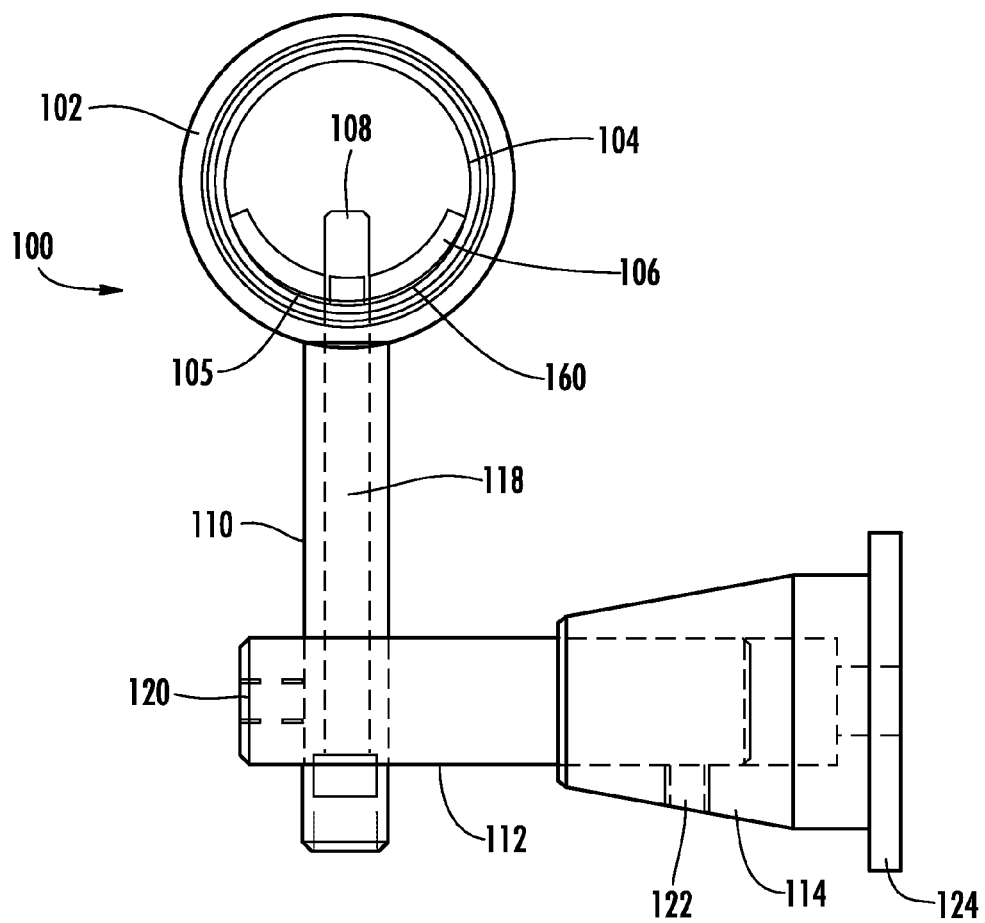
FIG. 1 is an end view of a wall mounted hand rail support system according to the present disclosure, with a hand rail section positioned within the support and aspects of the various components of the system shown in hidden lines.
Figure 2:
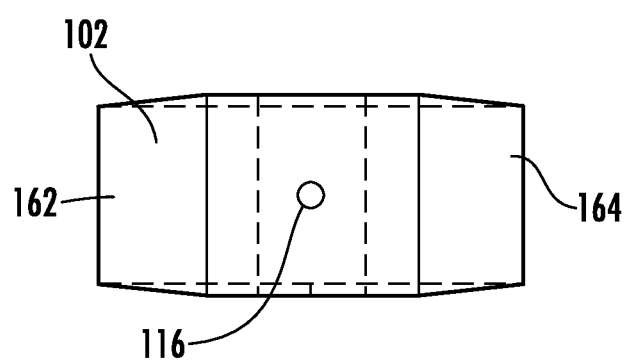
FIG. 2 is a bottom view of a rail support barrel for use with the system of FIG. 1.
Figure 3:
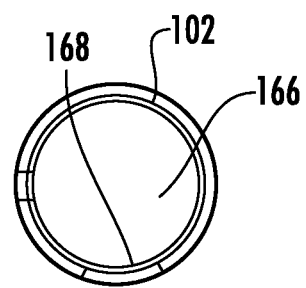
FIG. 3 is an end view of the barrel of FIG. 2.
Figure 5:
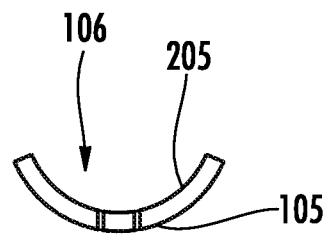
FIG. 5 is an end view of the clamp of FIG. 4.
Figure 4:
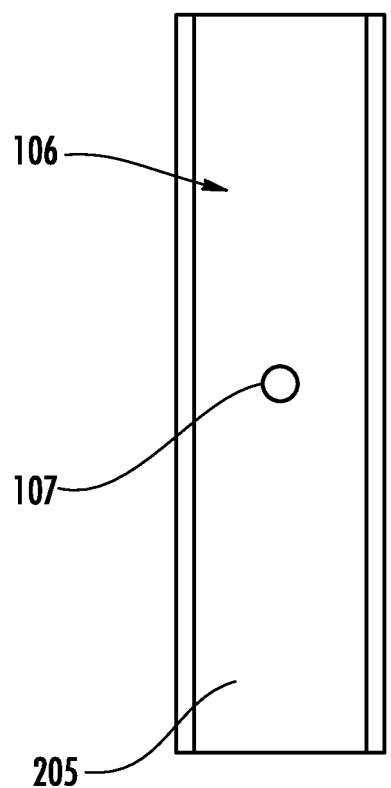
FIG. 4 is a top view of a clamp for use with the barrel of FIG. 2.
Figure 7:
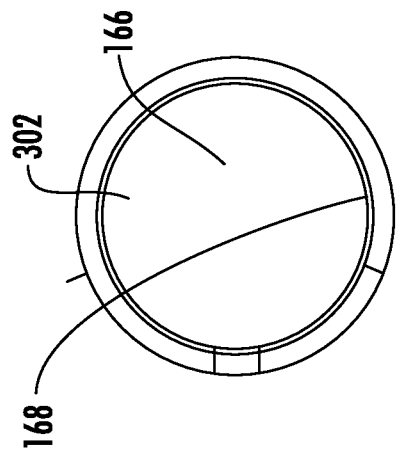
FIG. 7 is an end view of the barrel of FIG. 6.
Figure 6:
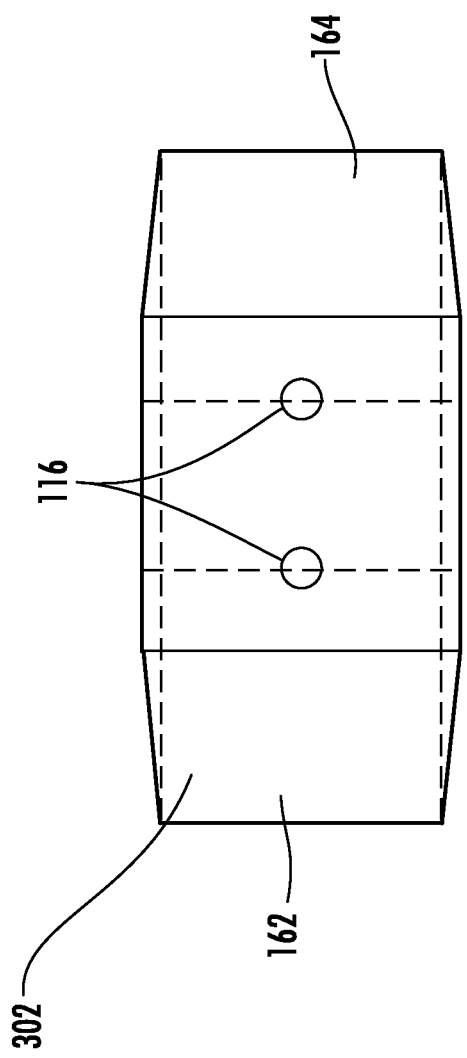
FIG. 6 is a bottom view of a first alternative embodiment of a rail support barrel for use with the system of FIG. 1.
Figure 9:
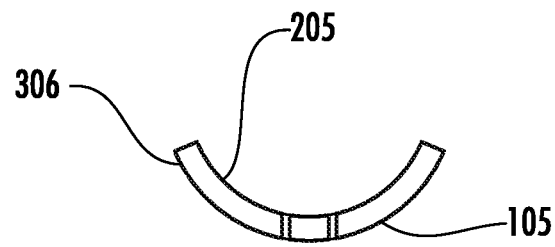
FIG. 9 is an end view of the clamp of FIG. 8.
Figure 8:
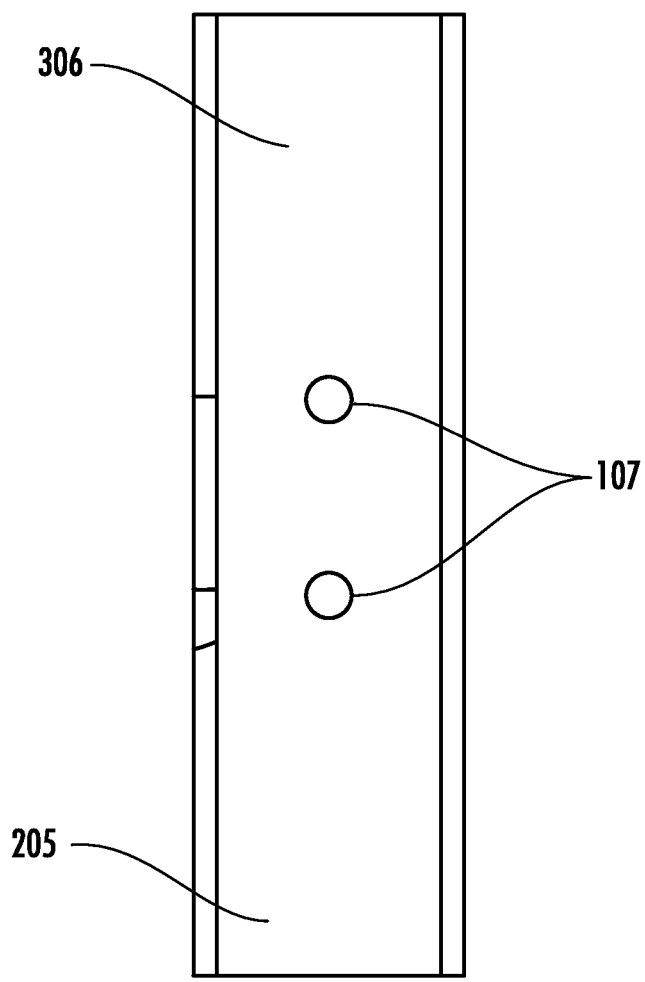
FIG. 8 is a top view of a clamp for use with the barrel of FIG. 6

FIG. 1 illustrates a new hand rail mounting system 100 with a barrel 102 within which a hand rail 104 may be inserted into each end. As shown hand rail 104 is a hollow tubular hand rail but other types of hand rails will be discussed below and are within the scope of the present disclosure. Hand rail 104 may be secured within barrel 102 by an internal clamp 106 that is drawn into securement with hand rail 104 by one or more screws or threaded fasteners 108 that may extend upward through the barrel. Clamp 106 is preferably formed or shaped to have an outward rounded surface 105 that is shaped to generally match the shape of an inner wall surface 160 of rail 104 to ensure sufficient engagement between clamp 106 and rail 104. Clamp 106 may also define an inward rounded surface 205 opposite outward rounded surface 105.

Supporting barrel 102 and hand rail 104 may be one or more supports to that extend to the wall to which the hand rail is to be attached. A vertical support 110 may be positioned underneath barrel 102 and may be connected to a horizontal support 112 that extends toward a wall to which support system 100 may be mounted. A bracket hub 114 may be connected to a second end of horizontal support 112 to assist in connection of system 100 to the wall. In addition, a first backing or support disk 124 (shown in FIGS. 25, 26 and 31) may be mounted between bracket hub 114 and the wall and a second backing or support disk 126 (shown in FIGS. 27, 28 and 31) may be mounted to an opposite of the wall to spread any load applied to the hand rail over a larger portion of the wall. Such disks may be desired or required when the wall is made of a material, such as but not limited to glass, where a concentrated load may cause failure of the material in the area around the bracket hub.

FIGS. 2 to 5 further illustrate barrel 102 and clamp 106 for use with system 100. Barrel 102 may include a single center mounted screw or fastener opening 116. A single clamping screw or fastener 118 (shown in FIG. 1) may be extended upward through vertical support 110 and engage clamp 106. Tightening screw 118 will draw the clamp 106 down with outward surface 105 engaging an inner wall of rail 104 and securing the rail to the barrel. Screw 118 will also connect vertical support 110 to barrel 102. As shown in FIG. 1, vertical support 110 engages horizontal support 112 and a set or lock screw 120 may be used to releasably lock the two supports to each other.

Horizontal support 112 may be slidably received within a central opening of bracket hub 114 and a set screw 122 may be used to secure support 112 within the central opening of the bracket hub. This slidable relationship permits the rail to be aligned linearly regardless of variations in the wall to which the rail is attached.

FIGS. 2 to 5 illustrate barrel 102 and clamp 106. Barrel 102 may include opposite ends 162 and 164 for receiving ends of rails 104 with an interior 166 extending generally between the ends. Interior 166 is preferably sized and configured to generally closely match the size and shape of an outer shape of rail 104 (or other rails that may be held within a rail mounting system according to the present disclosure). Within interior 166 is defined an inner wall 168.

It may be preferable to have clamp 106 extend further than the length of barrel 102 to ensure more engagement between the clamp and rail 104. With the clamp hidden within the interior of rail 104, the extra length of the clamp would be invisible once the rail and support system are installed. Clamp 106 may have one or more openings 107 for fasteners such as screw 108 to engage the clamp and draw the clamp into engagement with rails 104. To aid in ease of installation, openings 107 may be threaded to match threads of screw 108. Alternatively, a separate nut may be used above clamp 106 to receive and engage screw 108 and exert clamping pressure on rails 104.

The ends of rail 104 would be preferably completely or mostly enclosed enclosed within barrel 102, and the length of barrel 102 provides some margin for error in the cutting of rail 104. By having the ends of rail 104 completely within the barrel, the cut ends of the rail would not have to be finished. The clamp within the barrel would also secure the ends of the rail with respect to each other so that the ends would not have to welded to each other. Having a length of rail 104 within clamp 102 will also permit some lateral movement of rail 104 with regard to clamp 102 will also allow for expansion and contraction of the structure or the railing system due to weather variations, building settling or movement, or other gradual changes. This overlapping may also permit the railing system to resist being pulled apart during a more dramatic movement event, such as an earthquake.

Figure 29:
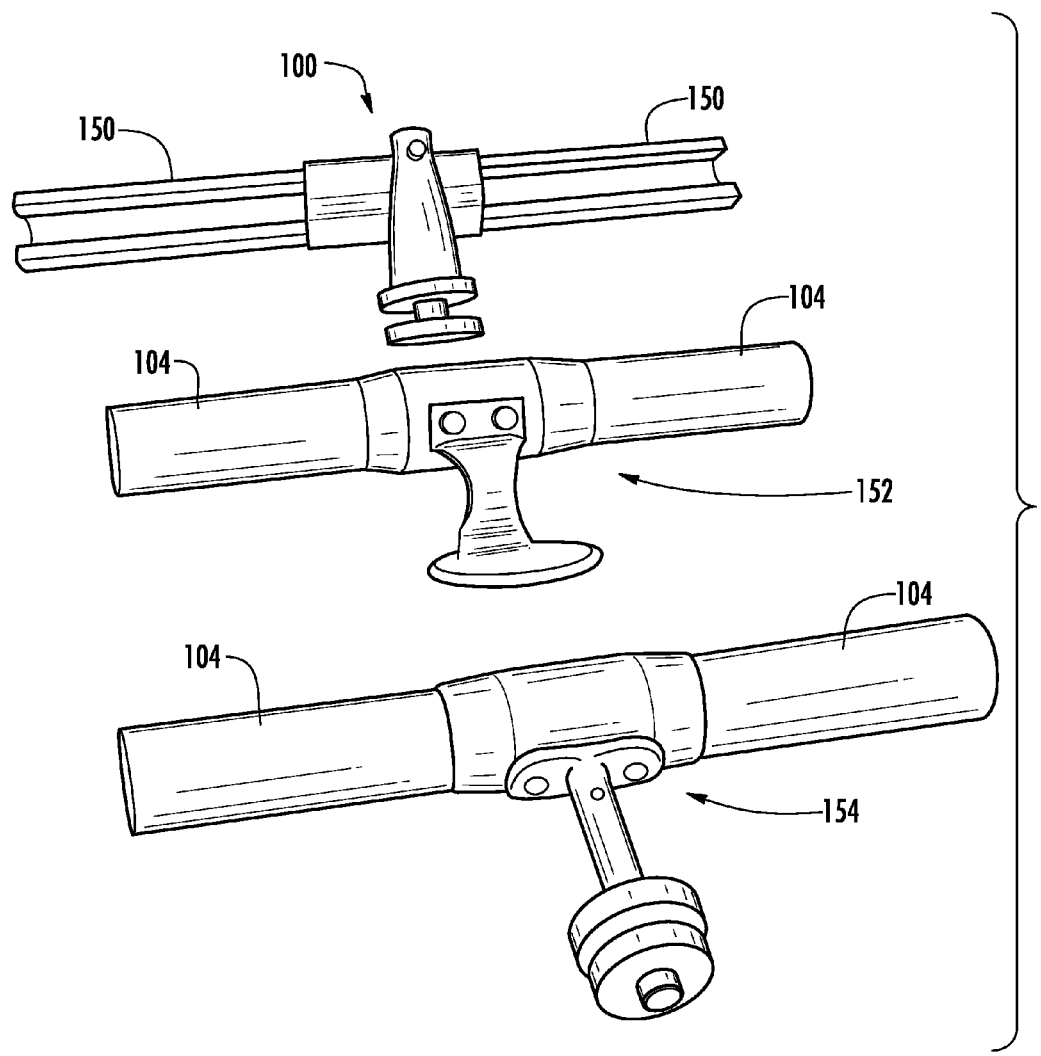
FIG. 29 is a perspective view of the system of FIG. 1 with an alternative rail inserted, a first alternative embodiment of a support according to the present disclosure and a second alternative embodiment according to the present disclosure.

FIGS. 6 to 17 illustrate further alternatives for barrels and clamps according to the present disclosure. These designs include a pair of fastener openings permitting different supports illustrated in FIG. 29. FIGS. 6 to 9 illustrate an alternative embodiment barrel 302 and clamp 306. Barrel 302 is generally configured similarly to barrel 102 with a pair of openings 116, each configured to receive a screw 108. Clamp 306 is configured generally similarly to clamp 106 with a pair openings 107, each configured to engage a screw 108.

Figure 10:
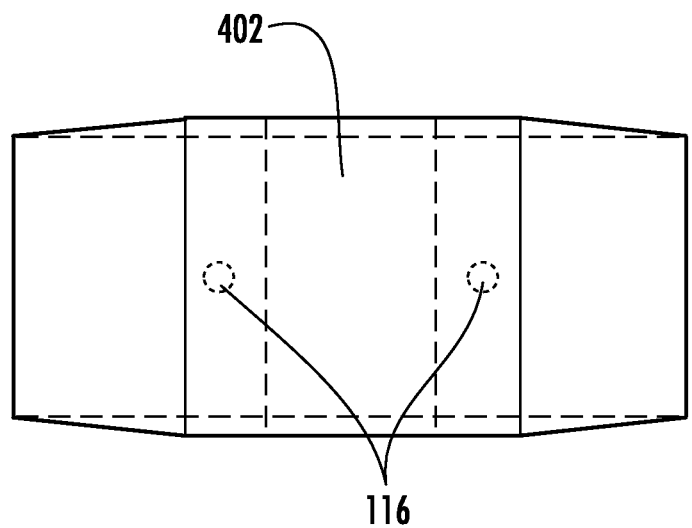
FIG. 10 is a bottom view of a second alternative embodiment of rail support barrel for use with the system of FIG. 1.
Figure 11:
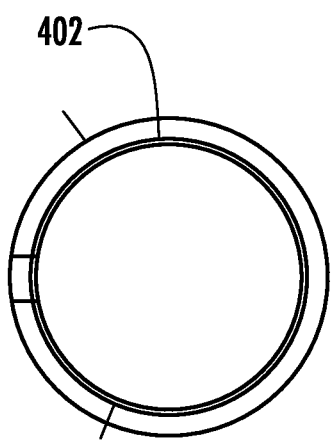
FIG. 11 is an end view of the barrel of FIG. 10.

FIGS. 10 and 11 illustrate a further embodiment of a barrel 402 for use with a rail mounting system according to the present disclosure. Barrel 402 differs from barrel 302 primarily with regard to the spacing of openings 116. Other structural elements of the barrels are essentially the same.

FIGS. 12 and 13 illustrate a further embodiment of a clamp 406 for use with a rail mounting system according to the present disclosure. Clamp 406 differs from clamp 306 primarily with regard to the spacing of openings 107. Other structural elements of the clamps are essentially the same.

Figure 15:
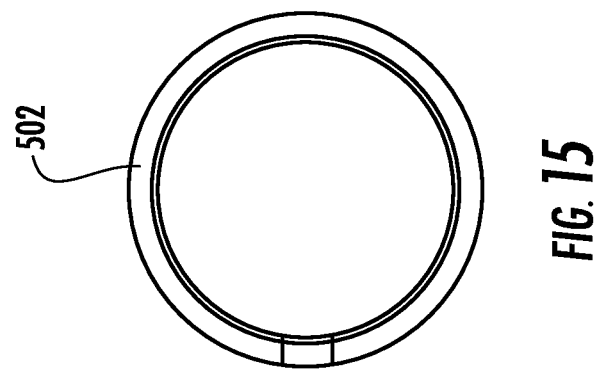
FIG. 15 is an end view of the barrel of FIG. 14.
Figure 14:
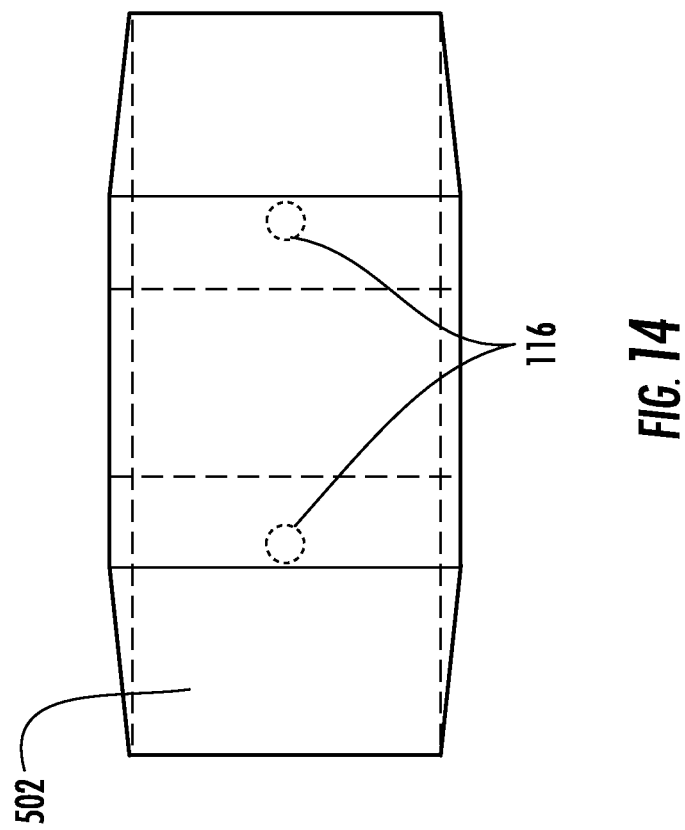
FIG. 14 is a bottom view of a second alternative embodiment of rail support barrel for use with the system of FIG. 1.

FIGS. 14 and 15 illustrate a still further embodiment of a barrel 502 for use with a rail mounting system according to the present disclosure. Barrel 502 differs from barrel 302 primarily with regard to the spacing of openings 116. Other structural elements of the barrels are essentially the same.

Figure 17:
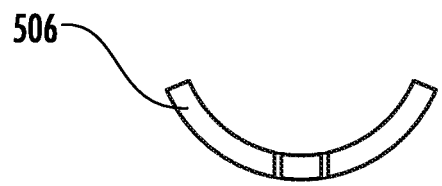
FIG. 17 is an end view of the clamp of FIG. 16.
Figure 16:
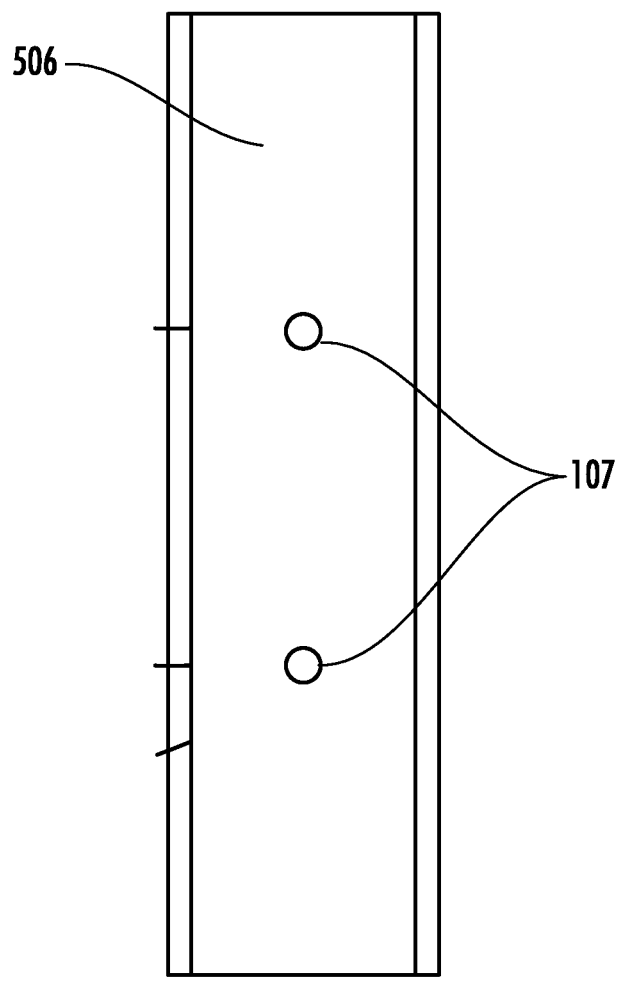
FIG. 16 is a top view of a clamp for use with the barrel of FIG. 14.

FIGS. 16 and 17 illustrate a further embodiment of a clamp 506 for use with a rail mounting system according to the present disclosure. Clamp 506 differs from clamp 306 primarily with regard to the spacing of openings 107. Other structural elements of the clamps are essentially the same.

Figure 19:
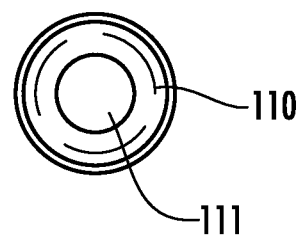
FIG. 19 is an end view of the vertical post of FIG. 18.
Figure 18:
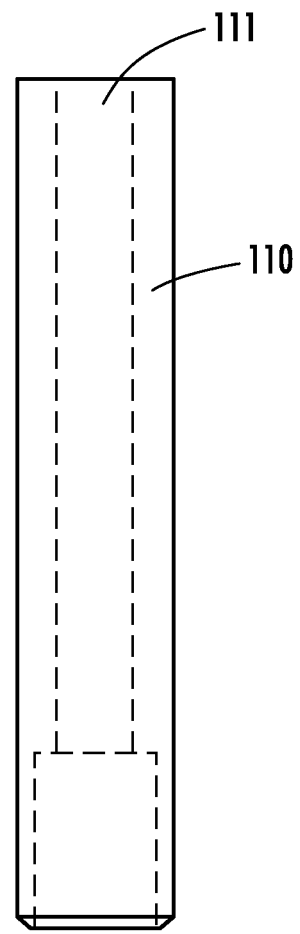
FIG. 18 is a side view of a vertical post for use with the system of FIG. 1.

FIGS. 18 and 19 illustrate vertical support 110 with an opening 111 through which screw 118 may extend to aid in the clamping of rails 104 to barrel 102.

Figure 20:
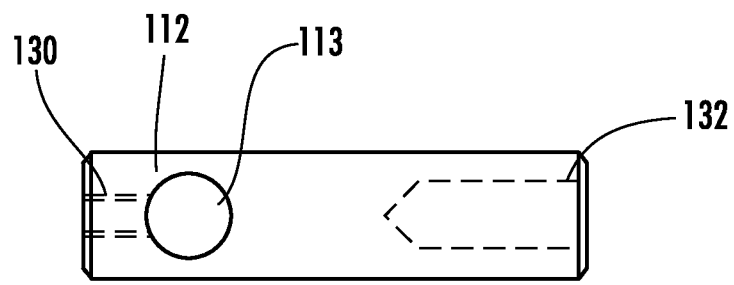
FIG. 20 is a first side view of a horizontal post for use with the system of FIG. 1.
Figure 21:
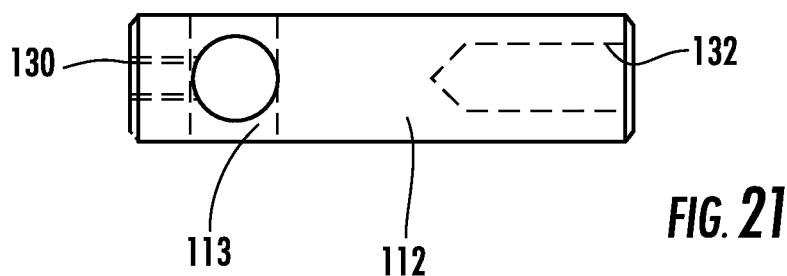
FIG. 21 is a second side of the horizontal post of FIG. 20, with the post rotated approximately ninety degrees.
Figure 22:
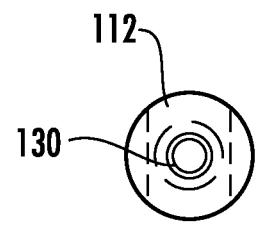
FIG. 22 is an end view of the horizontal post of FIG. 20.

FIGS. 20 to 22 illustrate horizontal support 112 with an opening 113 for receiving vertical support 110 and including an set screw opening 130 for receiving set or lock screw 120 to secure the vertical support at the desired height. On an end opposite opening 130 may be a second opening 132 for receiving a fastener for securing horizontal support 112 to bracket hub 114.

Figures 23, 24:
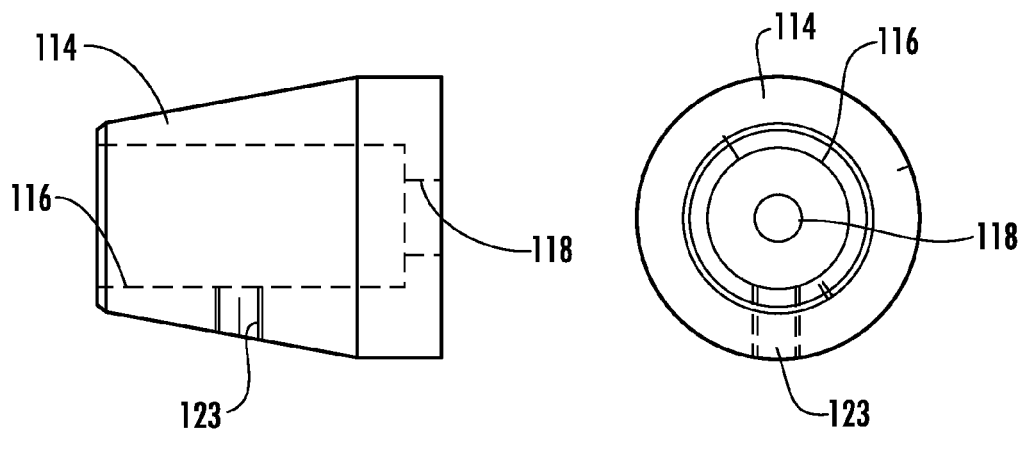
FIG. 23 is a side view of a bracket hub of the system of FIG. 1.
FIG. 24 is an end view of the bracket hub of FIG. 24.

FIGS. 23 and 24 illustrate bracket hub 114 with an opening 123 to receive set or locking screw 122 to secure horizontal support 112 within a support opening 116. Opening 116 may further have a fastener opening 118 to receive a larger fastener extending from the structure or wall to which the hand rail mounting system 100 may be secured.

Figure 25:
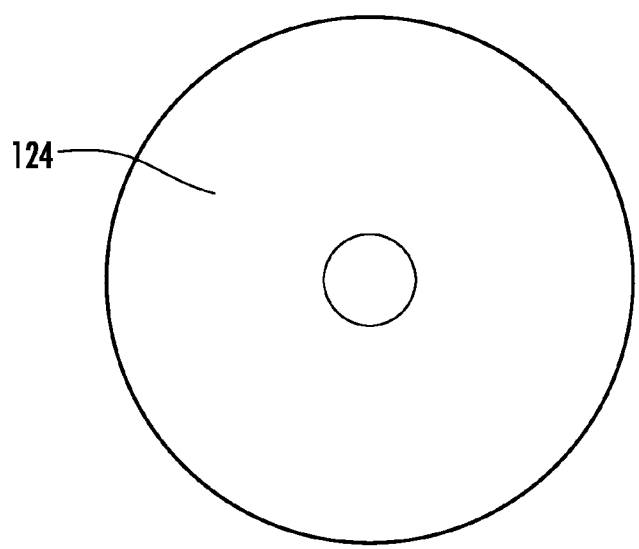
FIG. 25 is an end view of a front mounting support disk for use with the system of FIG. 1.
Figure 26:
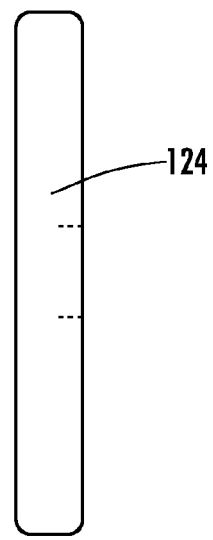
FIG. 26 is a side view of the disk of FIG. 25.

FIGS. 25 and 26 illustrate a first backing disk 124 that may be positioned between the bracket hub and the wall to which the rail is to be mounted.

Figure 27:
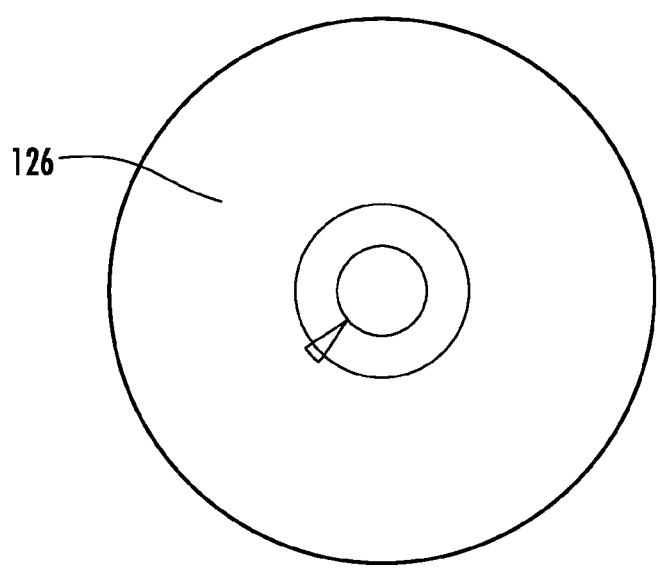
FIG. 27 is an end view of a back mounting support disk for use with the system of FIG. 1.
Figure 28:
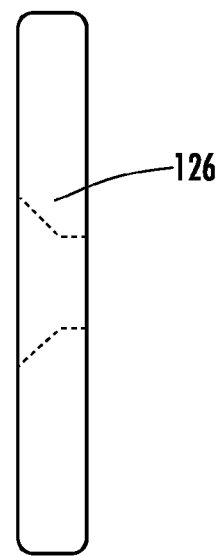
FIG. 28 is a side view of the disk of FIG. 27.

FIGS. 27 and 28 illustrate a second backing disk 126 that may be positioned on an opposite side of the wall to which the rail may be mounted.

Figure 30:
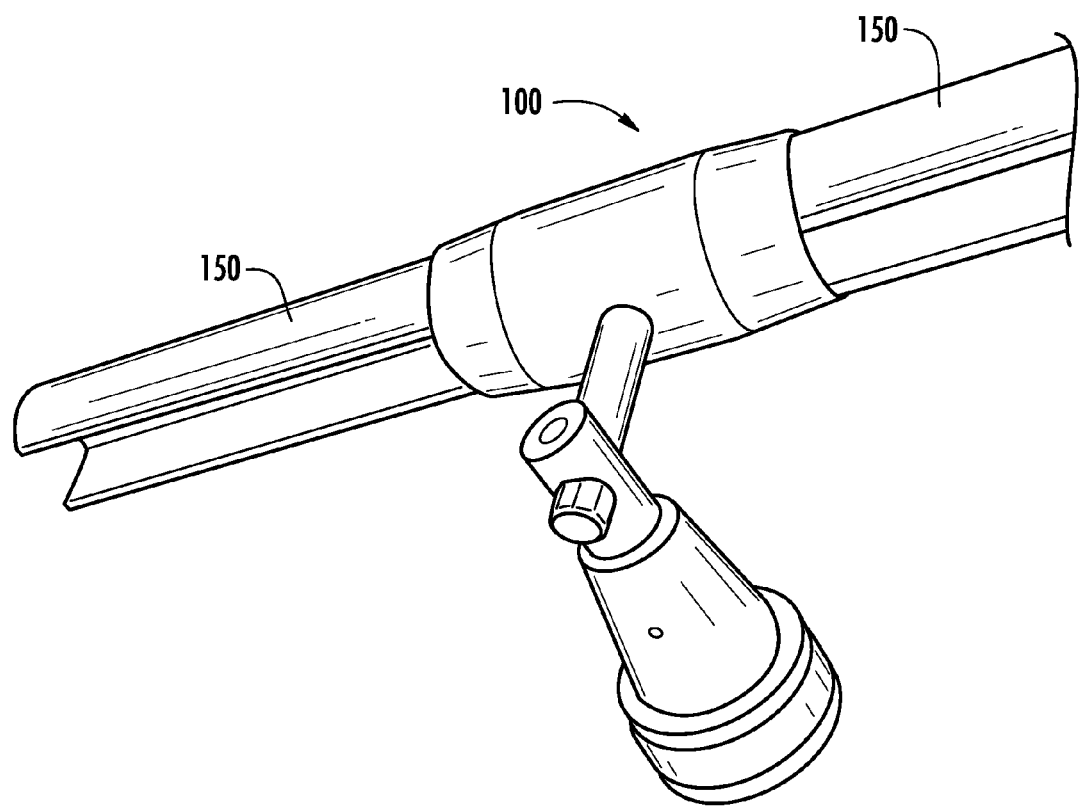
FIG. 30 is a lower perspective view of the rail mounting system of FIG. 29 with the alternative rail.
Figure 31:
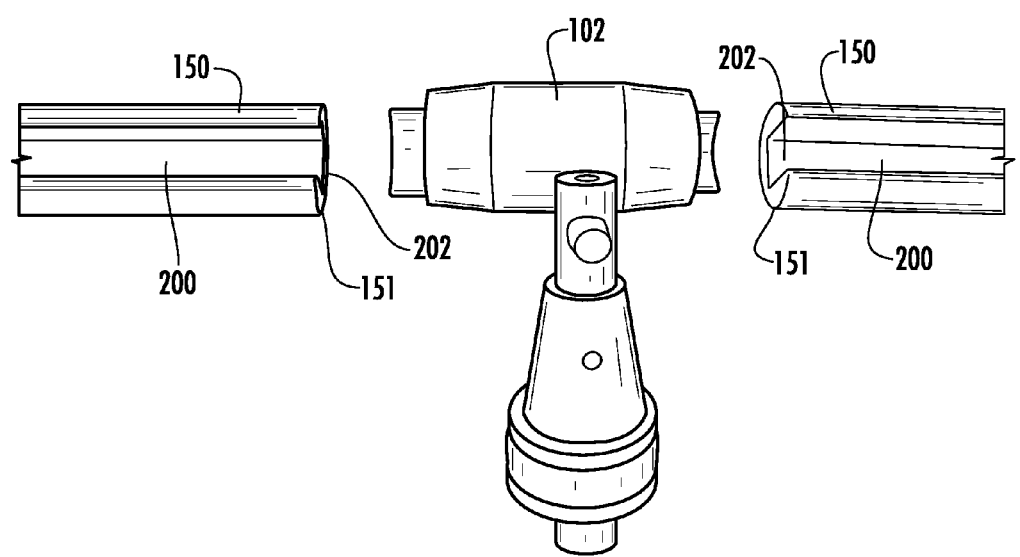
FIG. 31 is lower perspective view of the system of FIG. 30 with the rails exploded out.
Figure 32:
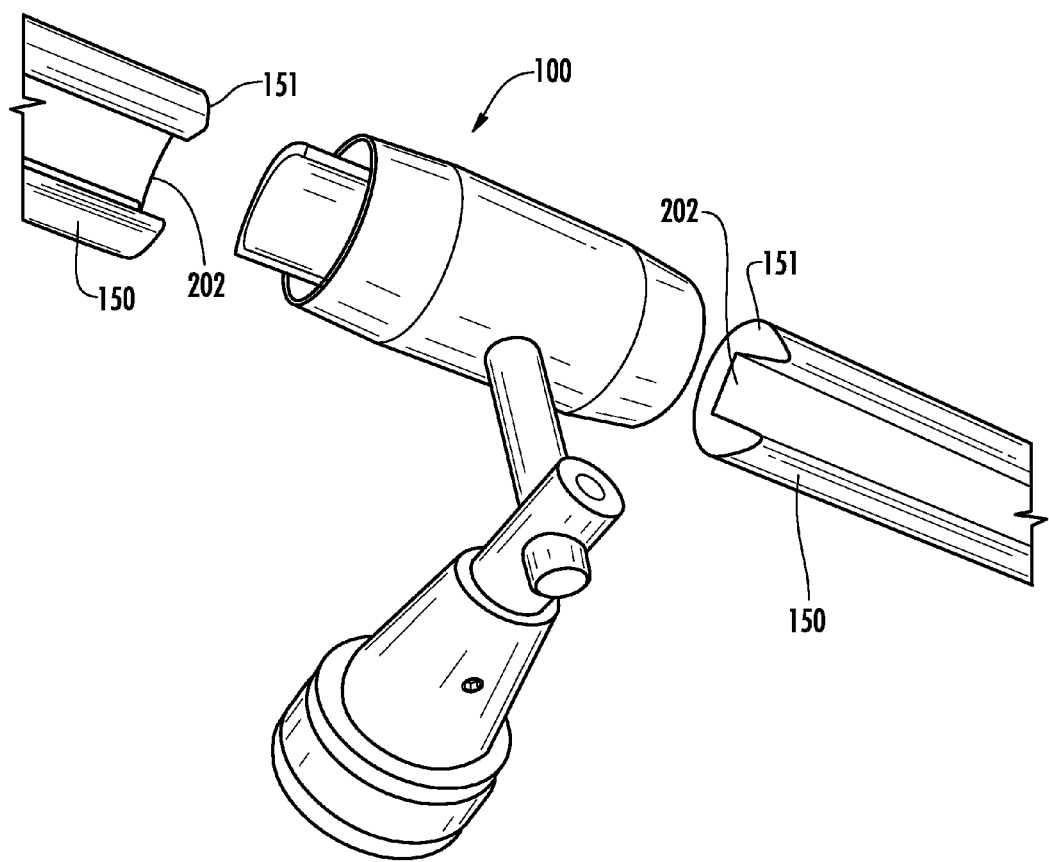
FIG. 32 is a second perspective view of the system of FIG. 31.
Figure 33:
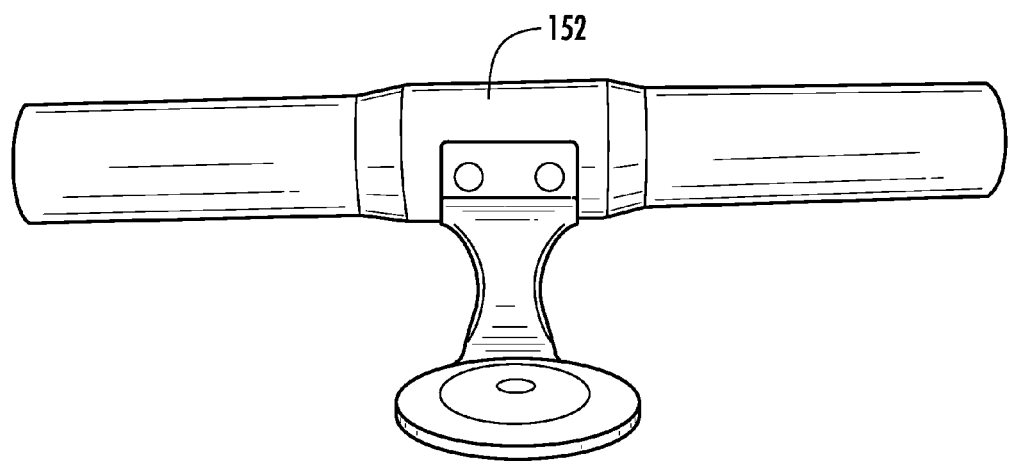
FIG. 33 is a lower perspective view of the first alternative system of FIG. 29.
Figure 34:
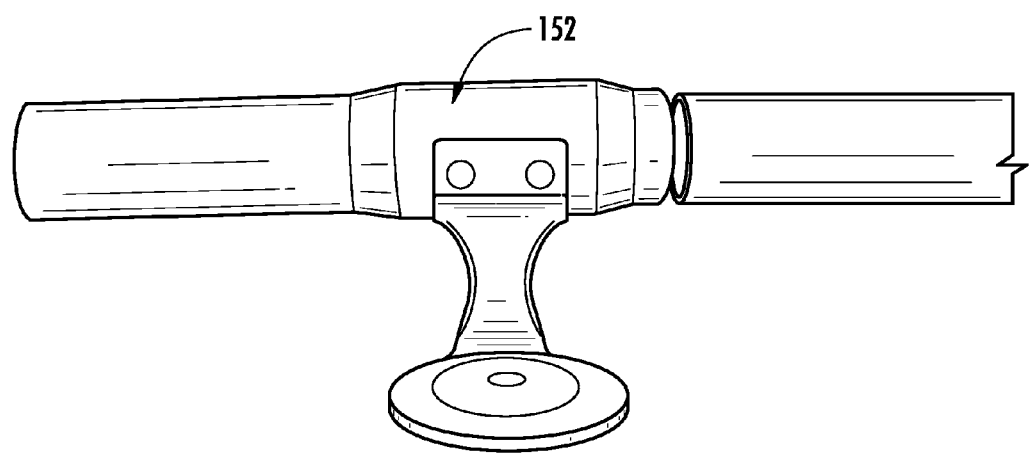
FIG. 34 is a lower perspective view of the system of FIG. 33 with a rail exploded out.

FIGS. 30 to 32 illustrate a system 100 with an alternative rail 150 that includes a channel underneath for receiving a variety of lights or other elements that may be desired as part of a hand rail. Each rail 150 includes an engagement end 152 that is intended to be inserted within barrel 102. As shown in FIGS. 31 and 32, system 100 is configured differently from the assembly shown in FIG. 1 to conform to the shape of rail 150. Where rail 104 had a generally continuous interior, rail 150 includes a lower channel 200 with a wall 202 extending into an interior of rail 150. Clamp 106 may be sized and shaped so that clamp 106 fits within the open end of rail 150 above wall 202. Note that clamp 106 has been rotated halfway so that outward rounded portion 105 of clamp 106 is up. In this configuration, inward round portion 205 is positioned to engage wall 202 when screw 108 draws the clamp into engagement with the rail. When screw 118 is rotated to draw clamp 106 into engagement with rail 150, the clamp engages wall 202 rather than FIGS. 33 and 34 illustrate a first alternative embodiment of a wall support and connection system 152 that includes a pair of clamping screws 118 for use with the alternative embodiments of the barrels and clamps illustrated in FIGS. 6 to 17.

Figure 35:
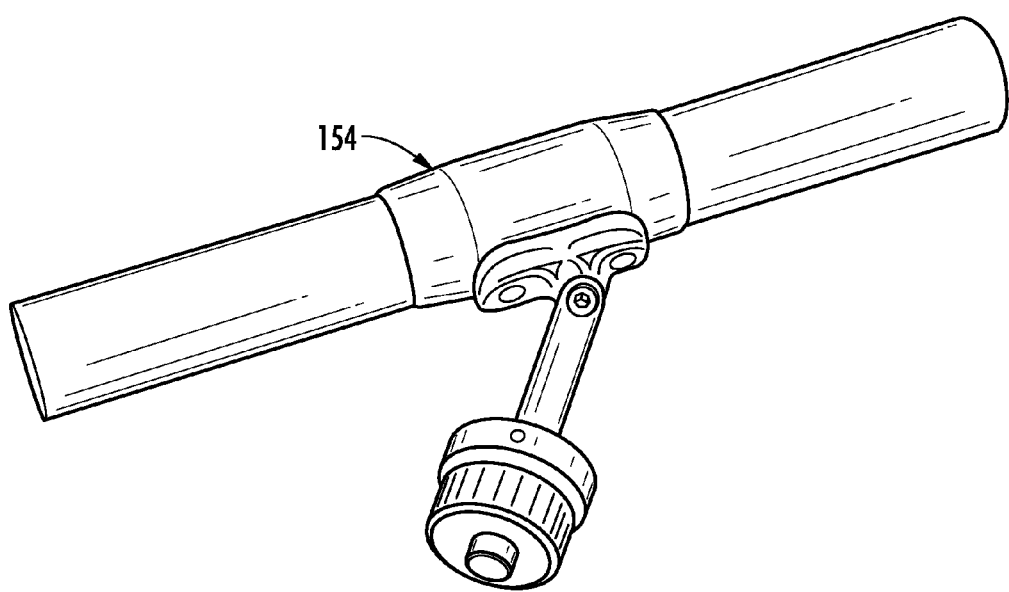
FIG. 35 is a side perspective view of the second alternative system of FIG. 29.
Figure 36:
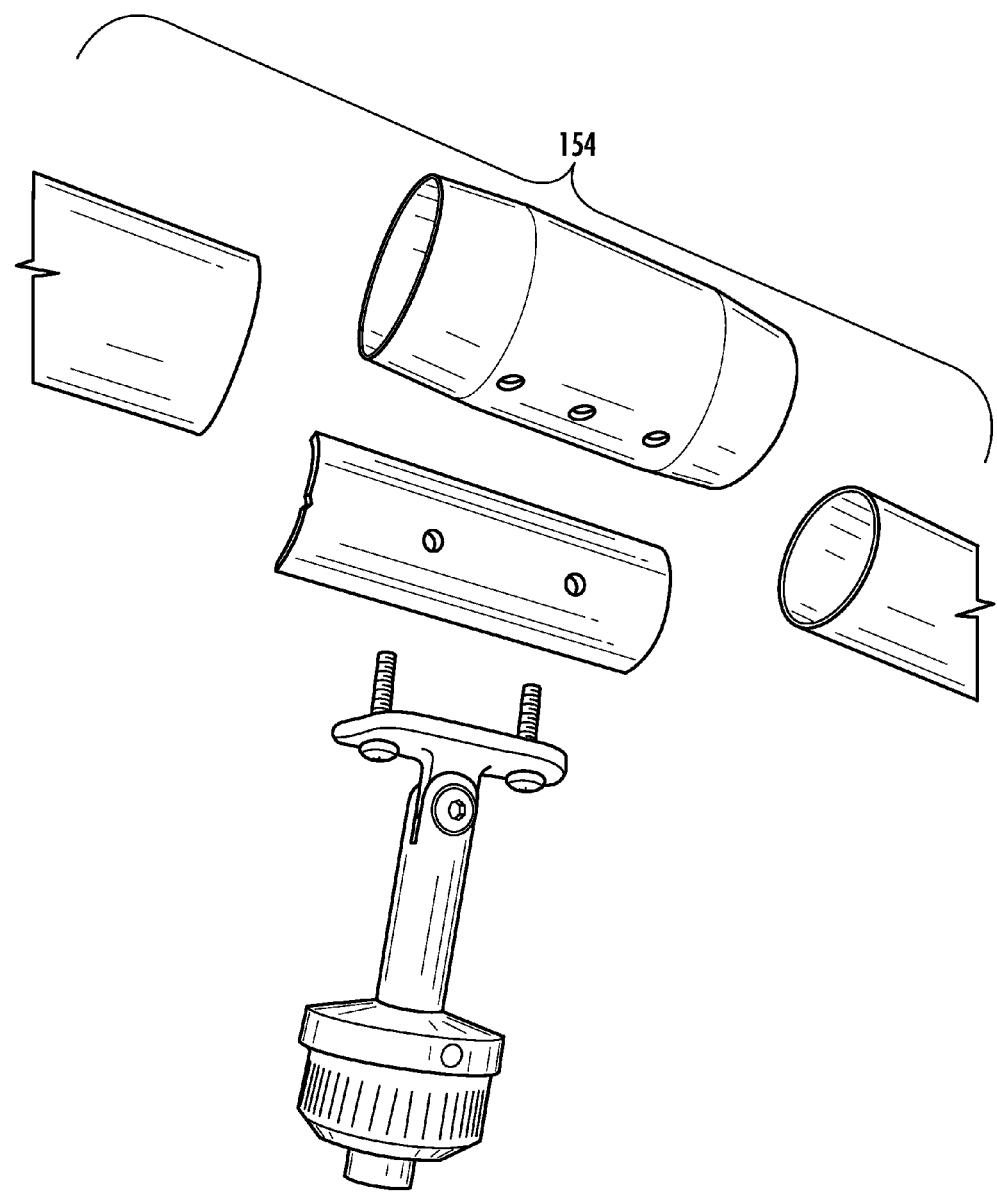
FIG. 36 is an exploded perspective view of the system of FIG. 35.

FIGS. 35 to 36 illustrate a second alternative embodiment 154 of a support that may be configured to mount the rail to a top of a wall and may also permit the mounting of the rail in an angled fashion by having a pivoting connection between the support and the barrel.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

What is claimed is:

1. A hand rail system comprising:
a rail having a first end;
a barrel with a first open end configured to fit closely about an outer surface of the rail and configured to slidably receive the rail within the barrel so as to facilitate construction of the system by concealing the first end of the rail;
a clamp positioned within the barrel and extending into the first end of the rail;
a screw extending through the barrel and engaging the clamp;
the screw configured so that rotating the screw will draw the clamp toward the barrel such that the clamp engages an inner wall surface of the rail and the barrel engages the outer surface of the rail;
wherein the first end of the rail is generally contained within the barrel up to the location where the screw extends through the barrel.

2. The hand rail system of claim 1, further comprising a support for mounting the system to a structure.

3. The hand rail system of claim 1, further comprising a second rail, wherein each of the rails has a first end and the barrel includes a second open end, such that the first open end and second open end are configured to fit closely about an outer surface of the first ends of the rails and configured to receive the first ends of the rails within the barrel with the first ends of the rails positioned between the clamp and the barrel, wherein rotating the screw draws the clamp toward the barrel and captures the first ends of the rails within the barrel between the barrel and the clamp.

4. The hand rail system of claim 1, wherein the clamp has a curved shape with a convex surface.

5. The hand rail system of claim 4, wherein the barrel has a generally round shape and the rail has a generally round shape, wherein the convex surface of the clamp generally matches the generally round shape of the rail.

6. The hand rail system of claim 1, wherein the rail has a channel, the channel defined by a wall within the interior of the rail, the clamp sized to fit within the first end of the rail above the wall defining the channel; and
wherein rotating the screw draws the clamp toward an inner wall of the barrel and captures the first end of the rail within the barrel with the clamp engaging the channel of the rail.

7. The hand rail system of claim 1, wherein the barrel has openings for receiving screws and the clamp has openings for receiving screws, wherein the barrel includes space between one of the openings and the first open end of the barrel for receiving the first end of the rail.

8. The hand rail system of claim 3, wherein the barrel has openings for receiving screws and the clamp has openings for receiving screws, and wherein the barrel includes space between the openings and the first and second open ends of the barrel for receiving the first ends of the two rails.

9. The hand rail system of claim 2, wherein the support includes a vertical support engaging the barrel from underneath.

10. The hand rail system of claim 9, wherein the screw extending through the barrel and engaging the clamp also extends through the vertical support.

11. The hand rail system of claim 9, the support further comprising a horizontal support engaging the vertical support, the horizontal support configured to be secured to a structure to which the system is to be mounted.

12. A hand rail mounting system with at least one rail comprising:
a barrel with a first open end configured to fit closely about an outer surface of the at least one rail and configured to slidably receive the at least one rail within the barrel;
a clamp positioned within the barrel and extending into the at least one rail;
a screw extending through the barrel and engaging the clamp;
the screw configured so that rotating the screw will draw the clamp and cause the clamp to contact an inner wall surface of the at least one rail and the barrel to contact the outer surface of the at least one rail to allow expansion and contraction of the rail;
wherein the at least one rail is slidably received by the barrel no further than the location at which the screw extends through the barrel; and
a support for mounting the system to a structure.

13. The hand rail mounting system of claim 12, wherein the barrel includes a second open end configured to fit closely about an outer surface of a second rail and configured to slidably receive the second rail within the barrel, with the clamp also extending into the second rail, and wherein rotating the screw draws the clamp toward the barrel and captures the at least one rail and the second rail within the barrel between the barrel and the clamp.

14. The hand rail mounting system of claim 12, wherein the clamp has a shape and the at least one rail has a shape that matches the shape of the clamp, such that when the clamp captures the at least one rail, the clamp fits generally flush with the inside of the at least one rail.

15. The hand rail mounting system of claim 12, wherein the at least one rail has a channel, the channel defined by a channel wall within the interior of the at least one rail, and wherein the clamp is sized to fit within the at least one rail, and wherein rotating the screw draws the clamp and the channel wall toward an inner wall of the barrel and captures the at least one rail the barrel with the clamp engaging the channel wall.

16. The hand rail mounting system of claim 12, wherein the barrel has openings for receiving screws and the clamp has openings for receiving screws, and wherein the barrel includes space between one of the openings and the first open end of the barrel for receiving the at least one rail.

17. The hand rail mounting system of claim 13, wherein the barrel has openings for receiving screws and the clamp has openings for receiving screws, and wherein the barrel includes space between the openings and the first and second open ends of the barrel for receiving the first and second ones of the at least one rail.

18. The hand rail mounting system of claim 12, wherein the support includes a first support portion oriented substantially perpendicular to and contacting the barrel.

19. The hand rail mounting system of claim 18, wherein the screw extending through the barrel and engaging the clamp also extends through the first support portion.

20. The hard a mounting system of claim 18, the support further comprising a second support portion engaging the first support portion, the second support portion configured to be secured to a structure to which the system is to be mounted.

* * * * *

UNITED STATES PATENT AND TRADEMARK OFFICE
CERTIFICATE OF CORRECTION

PATENT NO. : 8,757,566 B2  Page 1 of 1
APPLICATION NO. : 13/157149
DATED : June 24, 2014
INVENTOR(S) : Nash It is certified that error appears in the above-identified patent and that said Letters Patent is hereby corrected as shown below:

In the claims

Column 5, line 66, the word "slidably" should appear before the word "receive"

Column 6, line 11, the word "wall" should replace the word "wail"

Column 7, line 9, the word "within" should appear before the first occurrence of the word "the"

Signed and Sealed this
Sixteenth Day of September, 2014

Michelle K. Lee
*Deputy Director of the United States Patent and Trademark Office*